(12) United States Patent
Andersson (10) Patent No.: US 11,261,804 B2
(45) Date of Patent: Mar. 1, 2022

(54) INTERNAL COMBUSTION ENGINE SYSTEM (71) Applicant: VOLVO TRUCK CORPORATION, Gothenburg (SE)

(72) Inventor: Arne Andersson, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/964,658

(22) PCT Filed: Feb. 16, 2018

(86) PCT No.: PCT/EP2018/053919
§ 371 (c)(1),
(2) Date: Jul. 24, 2020

(87) PCT Pub. No.: WO2019/158211
PCT Pub. Date: Aug. 22, 2019

(65) Prior Publication Data
US 2021/0054792 A1 Feb. 25, 2021

(51) Int. Cl.
*F02D 13/02* (2006.01)
*F01N 3/10* (2006.01)
(Continued)

(52) U.S. Cl.
CPC ......... *F02D 13/0203* (2013.01); *F01N 3/101* (2013.01); *F01N 13/102* (2013.01);
(Continued)

(58) Field of Classification Search
CPC .. F02D 13/0203; F02D 41/0082; F02D 41/26; F02D 2200/021; F02B 37/02;
(Continued)

(56) References Cited

U.S. PATENT DOCUMENTS 9,068,907 B1   6/2015   Kang et al.
9,080,523 B1   7/2015   Ulrey et al.
(Continued)

FOREIGN PATENT DOCUMENTS

DE   4344277 A1   6/1995
EP   2776690 A2   9/2014
(Continued)

OTHER PUBLICATIONS

International Search Report and Written Opinion dated May 14, 2018 in corresponding International PCT Application No. PCT/EP2018/053919, 10 pages.
(Continued)

*Primary Examiner* — Thai Ba Trieu
(74) *Attorney, Agent, or Firm* — Venable LLP; Jeffri A. Kaminski (57) ABSTRACT

An internal combustion engine system includes a combustion cylinder provided with a reciprocating piston movable between a top dead center (TDC) and a bottom dead center (BDC) within the combustion cylinder. A first outlet valve is connected to the combustion cylinder for controllably directing exhaust gas from the combustion cylinder to a first exhaust gas manifold of the internal combustion engine system. A second outlet valve is connected to the combustion cylinder for controllably directing exhaust gas from the combustion cylinder to a second exhaust gas manifold of the internal combustion engine system. A turbocharger system includes a turbine and a compressor, wherein the turbine is arranged in fluid communication with the first exhaust gas manifold. An exhaust emission control device is arranged in fluid communication with the second exhaust gas manifold.

11 Claims, 6 Drawing Sheets

(51) Int. Cl.
*F01N 13/10* (2010.01)
*F02D 41/00* (2006.01)
*F02D 41/26* (2006.01)
*F02B 37/02* (2006.01)
*F02B 75/02* (2006.01)

(52) U.S. Cl.
CPC .............. *F02B 37/02* (2013.01); *F02B 75/02* (2013.01); *F02D 41/0082* (2013.01); *F02D 41/26* (2013.01); *F02B 2075/027* (2013.01); *F02D 2200/021* (2013.01)

(58) Field of Classification Search
CPC .... F02B 75/02; F02B 2075/027; F01N 3/101; F01N 13/102
USPC ................ 60/605.1, 602, 280, 285, 321–323
See application file for complete search history.

(56) References Cited

U.S. PATENT DOCUMENTS

| | | | |
|---|---|---|---|
| 9,739,221 | B2 | 8/2017 | Madison et al. |
| 9,840,971 | B2* | 12/2017 | Glugla .................. F02D 41/005 |
| 2005/0211219 | A1 | 9/2005 | Strom et al. |
| 2007/0130948 | A1 | 6/2007 | Boehm et al. |
| 2008/0209889 | A1* | 9/2008 | Scheinert .............. F01N 3/2053 60/286 |
| 2009/0241540 | A1 | 10/2009 | Robel |
| 2012/0023933 | A1 | 2/2012 | Ulrey et al. |
| 2012/0023935 | A1 | 2/2012 | Pursifull et al. |
| 2012/0073288 | A1 | 3/2012 | Ulrey et al. |
| 2013/0174816 | A1 | 7/2013 | Riley et al. |
| 2014/0373820 | A1 | 12/2014 | Pursifull et al. |
| 2015/0316005 | A1 | 11/2015 | Madison et al. |
| 2016/0131046 | A1 | 5/2016 | Leone et al. |
| 2016/0160765 | A1 | 6/2016 | Baek et al. |
| 2016/0169072 | A1 | 6/2016 | Roth |
| 2016/0215736 | A1 | 7/2016 | Millward |
| 2017/0292439 | A1 | 10/2017 | Rothenberger et al. |
| 2018/0171867 | A1* | 6/2018 | Ulrey .................... F01N 13/107 |
| 2018/0171868 | A1* | 6/2018 | Leone ................... F01N 13/107 |
| 2018/0171883 | A1* | 6/2018 | Ulrey ...................... F02D 41/26 |
| 2018/0171884 | A1* | 6/2018 | Ulrey ...................... F02D 41/26 |
| 2018/0171886 | A1* | 6/2018 | Ulrey ...................... F02D 41/26 |
| 2018/0171887 | A1* | 6/2018 | Ulrey ...................... F02D 41/26 |
| 2018/0171897 | A1* | 6/2018 | Boyer ................... F01N 13/107 |
| 2018/0171898 | A1* | 6/2018 | Ulrey ...................... F02D 41/26 |
| 2018/0171899 | A1* | 6/2018 | Ulrey ...................... F02D 41/26 |
| 2018/0171904 | A1* | 6/2018 | Ulrey ...................... F02D 41/26 |
| 2018/0171905 | A1* | 6/2018 | Ulrey ...................... F02D 41/26 |
| 2018/0171906 | A1* | 6/2018 | Ulrey ...................... F02D 41/26 |
| 2018/0171907 | A1* | 6/2018 | Ulrey ...................... F02D 41/26 |
| 2018/0171908 | A1* | 6/2018 | Ulrey ...................... F02D 41/26 |
| 2018/0171911 | A1* | 6/2018 | Ulrey ...................... F01N 3/101 |
| 2018/0171913 | A1* | 6/2018 | Ulrey ...................... F02D 41/26 |
| 2018/0171914 | A1* | 6/2018 | Ulrey ...................... F02D 41/26 |
| 2018/0171917 | A1* | 6/2018 | Ulrey ................. F02D 13/0203 |
| 2018/0320612 | A1* | 11/2018 | Ulrey ...................... F02D 41/26 |
| 2018/0320613 | A1* | 11/2018 | Ulrey ...................... F02D 41/26 |
| 2018/0340482 | A1* | 11/2018 | Ulrey ...................... F02D 41/26 |
| 2018/0355824 | A1* | 12/2018 | Springer ................ F01N 3/101 |
| 2018/0363577 | A1* | 12/2018 | Ulrey ...................... F02D 41/26 |
| 2019/0003412 | A1* | 1/2019 | Ulrey ................... F01N 13/107 |
| 2019/0032579 | A1* | 1/2019 | Ulrey ...................... F02D 41/26 |
| 2019/0055891 | A1* | 2/2019 | Ulrey ...................... F02D 41/26 |
| 2019/0093579 | A1* | 3/2019 | Ulrey ...................... F01N 3/101 |
| 2019/0120146 | A1* | 4/2019 | Ulrey ...................... F02D 41/26 |
| 2019/0234327 | A1* | 8/2019 | Ulrey ...................... F02D 41/26 |
| 2019/0263384 | A1* | 8/2019 | Ulrey ...................... F02D 41/26 |
| 2020/0208581 | A1* | 7/2020 | Ulrey ...................... F02D 41/26 |
| 2020/0284217 | A1* | 9/2020 | Hakeem ................ F01N 13/107 |

FOREIGN PATENT DOCUMENTS

| | | |
|---|---|---|
| EP | 3184774 A1 | 6/2017 |
| FR | 2916226 A3 | 11/2008 |
| FR | 3035151 A1 | 10/2016 |
| GB | 2410060 A | 7/2005 |
| JP | 2003065061 A | 3/2003 |
| SE | 9802510 | 7/1998 |
| WO | 2009040642 A1 | 4/2009 |

OTHER PUBLICATIONS

International Preliminary Report and Patentability dated Apr. 29, 2020 in corresponding International PCT Application No. PCT/EP2018/053919, 15 pages.
China Office Action dated Aug. 3, 2021 in corresponding China Patent Application No. 201880088841.9, 16 pages.

* cited by examiner

INTERNAL COMBUSTION ENGINE SYSTEM

CROSS-REFERENCE TO RELATED APPLICATIONS

This application is a U.S. National Stage application of PCT/EP2018/053919, filed Feb. 16, 2018, and published on Aug. 22, 2019, as WO 2019/158211 A1, all of which is hereby incorporated by reference in its entirety.

TECHNICAL FIELD

The present invention relates to an internal combustion engine arrangement. The invention also relates to a corresponding method for operating an internal combustion engine. The invention is applicable on vehicles, in particularly low, medium and heavy duty vehicles commonly referred to as trucks. Although the invention will mainly be described in relation to a truck, it may also be applicable for other type of vehicles.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that becomes an important aspect when choosing vehicle engine. Furthermore, in the field of trucks, there are applicable law directives that have e.g. determined the maximum amount of exhaust gas pollution allowable.

Conventionally, a combustion cylinder of an internal combustion engine comprises an inlet valve and an outlet valve, wherein the inlet valve is arranged in an open position at an intake phase during the downward motion of a piston in the combustion cylinder. The inlet valve is thereafter closed when the piston reaches the bottom dead center of the cylinder, and is closed during the combustion phase and the exhaust phase, and opened again when the piston reaches the top dead center for the next coming intake stroke. The outlet valve on the other hand is closed during the intake phase, the compression phase, the combustion phase and the expansion phase. Thereafter, when the piston leaves the bottom dead center after the expansion phase, the outlet valve is open during the exhaust phase.

Although this conventional operation of an internal combustion engine has been proven successful, there is however a desire to further optimize operation during at least some operating conditions. For example, reducing the emissions during cold start operation of the internal combustion engine is desirable.

SUMMARY

It is an object of the present invention to provide an internal combustion engine arrangement which at least partially overcomes the above described deficiencies. This is achieved by an example internal combustion engine system as described.

According to a first aspect of the present invention, there is provided an internal combustion engine arrangement comprising a combustion cylinder provided with a reciprocating piston movable between a top dead center (TDC) and a bottom dead center (BDC) within the combustion cylinder; a first outlet valve connected to the combustion cylinder for controllably directing exhaust gas from the combustion cylinder to a first exhaust gas manifold of the internal combustion engine arrangement; a second outlet valve connected to the combustion cylinder for controllably directing exhaust gas from the combustion cylinder to a second exhaust gas manifold of the internal combustion engine arrangement; a turbocharger arrangement comprising a turbine and a compressor, wherein the turbine is arranged in fluid communication with the first exhaust gas manifold; and an exhaust emission control device arranged in fluid communication with the second exhaust gas manifold, wherein the exhaust emission control device and the turbine are arranged in parallel with each other.

The wordings "top dead center" and "bottom dead center" should be construed as respective upper and lower end positions for the reciprocating motion of the piston within the combustion cylinder. Throughout the entire application, when stating that a valve is opened and closed at one of the top dead center and bottom dead center, it should be realized that some tolerances are within the scope of the specific definition. For example, when stating that a valve is opened, i.e. positioned in the open position when the piston reaches the bottom dead center, the valve must not necessarily be opened at the exact bottom dead center position of the piston, but can be opened slightly before the piston reached the bottom dead center, or slightly after the piston has left the bottom dead center.

The present invention is based on the insight that by connecting the turbine to the first exhaust gas manifold and the exhaust emission control device to the second exhaust gas manifold, the exhaust gas can controllably be provided to either one of, or both of the turbine and the exhaust emission control device depending on the current operating condition of the internal combustion engine arrangement.

A particular advantage is that during cold start of the internal combustion engine arrangement, exhaust gas be controllably directed solely to the second exhaust gas manifold and into the exhaust emission control device. Thus, during the exhaust phase, the first outlet valve is maintained in a closed position while the second outlet valve is arranged in an open position. This can be achieved by means of e.g. using outlet valves comprising flow controllable actuators, as will be described further below. Other alternatives are also conceivable, such as using a mechanism that controllably de-activates a valve.

Another advantage is that the first and second exhaust valves can open sequentially during the exhaust phase. In detail, the first outlet valve can be arranged in the open position during the initial phase of the exhaust stroke. When the piston has moved a predetermined number of crank angle degrees from the BDC towards the TDC, the second outlet valve can be arranged in the open position, either partly opened or fully opened, whereby the first outlet valve is closed. Thus, the exhaust gas is initially provided to the turbine, and thereafter scavenged at approximately atmospheric pressure to the exhaust emission control device. Further details with regards to this operation mode are given below.

Still further, positioning the turbine and the exhaust emission control device in fluid communication with different exhaust gas manifolds and in parallel with each other has the benefit of guiding exhaust gases to one of the turbine and the exhaust emission control device and not to the other. Hereby, the thermal inertia between the cylinders and the exhaust emission control device can be reduced as the flow of combustion gas exhausted to the exhaust emission control device is not pressurized by the turbine. Further, positioning the turbine and the exhaust emission control device in parallel with each other may also improve the durability of the exhaust emission control device as it will not be affected by the relatively high gas pressure levels of the turbine.

According to an example embodiment, the internal combustion engine arrangement may further comprise a first exhaust conduit arranged in downstream fluid communication with the turbine, and a second exhaust conduit arranged in downstream fluid communication with the exhaust emission control device, wherein the first and second exhaust conduits are connected to each other.

Thus, the exhaust gas in the first and second exhaust gas manifolds are mixed with each other downstream the turbine and the exhaust emission control device, respectively. Downstream the turbine should thus be construed such that the exhaust gas enters the turbine before being provided to the first exhaust conduit. Likewise, downstream the exhaust emission control device should be construed such that the exhaust gas enters the exhaust emission control device before being provided to the second exhaust conduit.

According to an example embodiment, the exhaust emission control device may be a catalytic converter arrangement.

According to an example embodiment, the exhaust emission control device may be a three-way catalytic converter arrangement.

By using a three-way catalyst, the internal combustion engine arrangement can advantageously be operated in a stoichiometric mode, which is a mode where substantially no surplus of oxygen is provided in the exhaust gas generated after the combustion phase. Operating the internal combustion engine arrangement in the stoichiometric mode will rapidly light off the three-way catalyst, resulting in a substantial increase of the temperature level of the three-way catalyst. Furthermore, operating the internal combustion engine arrangement in the stoichiometric mode in combination with the use of a three-way catalyst will result in that substantially no NOx is provided in the exhaust gas downstream the three-way catalyst as nitrogen oxide (NO), carbon monoxide (CO) and hydrocarbon (HC) in the exhaust gas is converted to nitrogen ($N_2$), water ($H_2O$) and carbon dioxide ($CO_2$) in the warm three-way catalyst.

According to an example embodiment, the internal combustion engine arrangement may comprise an exhaust gas aftertreatment system positioned in downstream fluid communication with the three-way catalyst.

The warm three-way catalyst will thus heat up the exhaust gas aftertreatment system which will rapidly make the exhaust gas aftertreatment system operable. Conventionally, exhaust gas aftertreatment systems are heated by operating the internal combustion engine with low efficiency. The additional fuel combusted for such operation results in exhaustion of NOx gases. As stated above, operating the internal combustion engine arrangement in the stoichiometric mode in combination with the use of a three-way catalyst will on the other hand result in that substantially no NOx is provided in the exhaust gas downstream the three-way catalyst as nitrogen oxide (NO), carbon monoxide (CO) and hydrocarbon (HC) in the exhaust gas is converted to nitrogen ($N_2$), water ($H_2O$) and carbon dioxide ($CO_2$) in the warm three-way catalyst.

As described, the exhaust gas aftertreatment system is positioned downstream the three-way catalyst. It should be readily understood that the exhaust gas aftertreatment system is also positioned downstream the turbine. Controlling the internal combustion engine arrangement to be operated in stoichiometric mode will be described further below.

According to an example embodiment, the first and second outlet valves may each comprise a respective first and second flow controllable actuator, the flow controllable actuators being arranged to controllably operate the respective outlet valve between an open position and a closed position.

A flow controllable actuator is preferably pneumatically operated by receiving pressurized gas for opening and closing the first and second outlet valves, respectively.

An advantage is that the outlet valves can be rapidly controlled between an open and a closed position. Also, the outlet valves may be operated independently of e.g. the rotation of a cam shaft.

According to an example embodiment, the internal combustion engine arrangement may further comprise a control unit connected to the first and second flow controllable actuators for operation thereof.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the control unit may be configured to receive a signal indicative of a temperature level of the internal combustion engine arrangement; compare the temperature level with a predetermined threshold limit; and control the first outlet valve to be arranged in a closed position and the second outlet valve to be arranged in an open position during an exhaust stroke of the internal combustion engine such that exhaust gas generated during combustion is directed solely to the exhaust emission control device during the entire exhaust stroke if the temperature level is below the predetermined threshold limit.

The exhaust stroke is the stroke of the internal combustion engine when the piston moves from the BDC to the TDC and combusted exhaust gas is exhausted through the outlet valve/valves. The intake stroke on the other hand is the stroke of the internal combustion engine when the piston moves from the top dead center (TDC) to the bottom dead center (BDC) and intake gas, preferably in the form of air, is provided into the combustion chamber.

As described above, during cold start the exhaust gas generated during combustion can preferably be directed solely to the exhaust emission control device. Hereby, the combustion gas will rapidly light off the exhaust emission control device which will reduce engine emissions. Hence, and as described above, by means of the three-way catalyst and stoichiometric operation, the aftertreatment system can be heated without generating substantially any NOx.

According to an example embodiment, the control unit may be configured to position the first outlet valve in the open position during a first portion of the exhaust stroke, and to position the second outlet valve in the open position during a second portion of the exhaust stroke, wherein the second portion ends after the first portion ends.

Hereby, scavenging towards atmospheric pressure is performed as the final exhaust of the combustion gas is directed towards the exhaust emission control device and not the turbine. This is advantageous as the exhaust gas of the scavenging phase has a low mass flow which may not contribute much to the operation of the turbine. Hence, the turbine mass flow can be controlled, whereby the turbine can be operated in a high efficiency area to a larger extent. Furthermore, by scavenging towards atmospheric pressure, the so-called pumping mean effective pressure (PMEP) during the intake stroke can also be increased in comparison to scavenging to a turbine.

The first outlet valve may be arranged in the open position when the piston travels e.g. the initial 100-120 CAD of the exhaust cycle, while the second outlet valve is arranged in the open position when the piston travels e.g. the final 90-100 CAD of the exhaust cycle. The second valve may thus be arranged in the open position slightly before the first valve is closed, i.e. the first and second valves may be arranged in the open position with an overlap. Other alternatives are off course conceivable.

Accordingly, and according to an example embodiment, the control unit may thus be configured to position the first outlet valve in the closed position at a first predetermined distance before the piston reaches the TDC during the exhaust stroke.

The first predetermined distance may be e.g. 60-80 CAD before the piston reaches TDC. Any alternative within this range is conceivable and depends, for example, on the specific engine in question, or current operation mode, etc. Other ranges of the first predetermined distance are also conceivable.

According to an example embodiment, the second portion of the exhaust stroke may be initiated at a second predetermined distance after the piston has left the BDC during the exhaust stroke.

The second predetermined distance may, for example be 80-90 CAD after the piston has left the BDC. Any alternative within this range is conceivable and depends, for example, on the specific engine in question, or current operation mode, etc. Other ranges of the second predetermined distance are also conceivable.

According to an example embodiment, the second exhaust gas manifold may comprise a heat insulating layer.

As the second exhaust gas manifold is not arranged in fluid communication with the turbine, it may not be exposed to relatively high gas pressures. Hereby, the second exhaust gas manifold can be insulated, thereby improving thermal efficiency as heat is substantially prevented from dissipating. In particular, when scavenging towards the second exhaust gas manifold, the gas pressure is relatively low. The second exhaust gas manifold may thus be arranged as a heat insulated exhaust gas manifold.

According to an example embodiment, the internal combustion engine arrangement may comprise a plurality of combustion cylinders, the plurality of combustion cylinders constitutes a first and a second set of combustion cylinders, wherein the first set of combustion cylinders are arranged in fluid communication with the turbine and the exhaust emission control device, and the second set of combustion cylinders are arranged in fluid communication with the turbine and an additional exhaust emission control device.

Accordingly, a first set of outlet valves are connected to the exhaust emission control device, while a second set of outlet valves are connected to the additional exhaust emission control device.

Hereby, one of the set of cylinders may direct exhaust gas to an exhaust emission control device, while the other set of cylinders direct exhaust gas to the turbine. Such mode of operation may be beneficial during engine regeneration. Thus, the internal combustion engine arrangement can be operated in stoichiometric mode in one set of cylinder, but not in the other set of cylinders. Naturally, the first and second sets of cylinders can direct exhaust gas to its respective exhaust emission control device, or they can both direct exhaust gas to the turbine.

Using first and second sets of cylinders, the flexibility of operating the internal combustion engine arrangement is improved.

According to an example embodiment, the exhaust emission control device and the additional exhaust emission control device may be arranged in parallel with each other. Hereby, conduits from the exhaust emission control device and the additional exhaust emission control device connect to each other and to the conduit from the turbine downstream each of the exhaust emission control device, the additional exhaust emission control device, and the turbine.

According to an example embodiment, the internal combustion engine arrangement may be a diesel fuel internal combustion engine arrangement operated in a four stroke fashion.

According to a second aspect, there is provided a method for operating an internal combustion engine arrangement, the internal combustion engine arrangement comprising a combustion cylinder provided with a reciprocating piston movable between a top dead center (TDC) and a bottom dead center (BDC) within the combustion cylinder; a first outlet valve connected to the combustion cylinder for controllably directing exhaust gas from the combustion cylinder to a turbine of a turbocharger arrangement; a second outlet valve connected to the combustion cylinder for controllably directing exhaust gas from the combustion cylinder to an exhaust emission control device; wherein the method comprises the steps of determining a temperature level of the internal combustion engine arrangement; comparing the temperature level with a predetermined threshold limit; and controlling the first outlet valve to be arranged in a closed position and the second outlet valve to be arranged in an open position during an exhaust stroke of the internal combustion engine such that exhaust gas generated during combustion is directed solely to the exhaust emission control device if the temperature level is below the predetermined threshold limit.

According to an example embodiment, the internal combustion engine arrangement may comprise an oxygen sensor for measuring oxygen levels in the exhaust gases, wherein the method further comprises the steps of receiving a signal from the oxygen sensor indicative of the oxygen levels in the exhaust gases; controlling an inlet valve of the internal combustion engine arrangement such that the oxygen level in the combustion gases is substantially zero.

By using an oxygen sensor, the internal combustion engine arrangement can be controlled to operate in a stoichiometric mode.

According to an example embodiment, the internal combustion engine arrangement may comprise a plurality of combustion cylinders, the plurality of combustion cylinders constitutes a first and a second set of combustion cylinders, wherein the step of controlling the inlet valve such that the oxygen level in the combustion gases is substantially zero is performed solely for inlet valves of one of the first and second sets of combustion cylinders.

Hereby, only a portion of the internal combustion engine arrangement is operated in the stoichiometric mode.

Further effects and features of the second aspect are largely analogous to those described above in relation to the first aspect.

According to a third aspect, there is provided a vehicle comprising an internal combustion engine arrangement according to any one of the embodiments described above in relation to the first aspect.

According to a fourth aspect, there is provided a computer program comprising program code means for performing the steps of any one of the embodiments described above in relation to the second aspect when said program is run on a computer.

According to a fifth aspect, there is provided a computer readable medium carrying a computer program comprising program means for performing the steps of any one of the embodiments described above in relation to the second aspect when said program means is run on a computer.

Effects and features of the third, fourth and fifth aspects are largely analogous to those described above in relation to the first and second aspects.

Further features of, and advantages with, the present invention will become apparent from the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
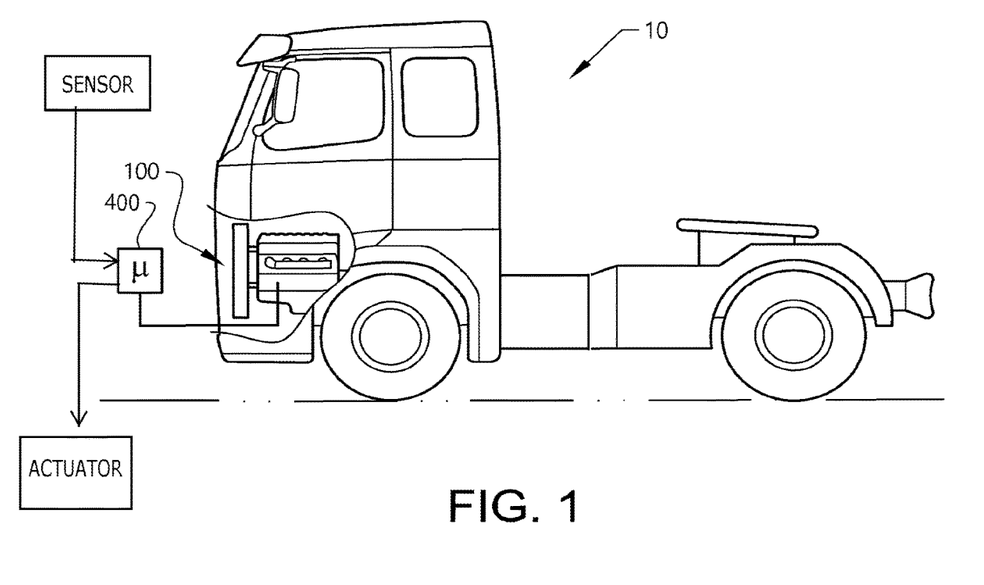
FIG. 1 is a lateral side view illustrating an example embodiment of a vehicle in the form of a truck.

With particular reference to FIG. 1, there is provided a vehicle 10 in the form of a truck. The vehicle 10 comprises a prime mover 100 in the form of an internal combustion engine arrangement 100. The internal combustion engine arrangement 100 may preferably be propelled by e.g. a conventional fuel such as diesel, although other alternatives are conceivable. The internal combustion engine 100 is preferably operated in a four stroke fashion, i.e. operated by an intake stroke, a compression stroke, a combustion stroke, and an exhaust stroke. As further depicted in FIG. 1, the internal combustion engine arrangement 100 also comprises a control unit 400 for controlling operation of the internal combustion engine arrangement 100. The control unit 400 is thus preferably arranged to control the valves described below.

Figure 2:
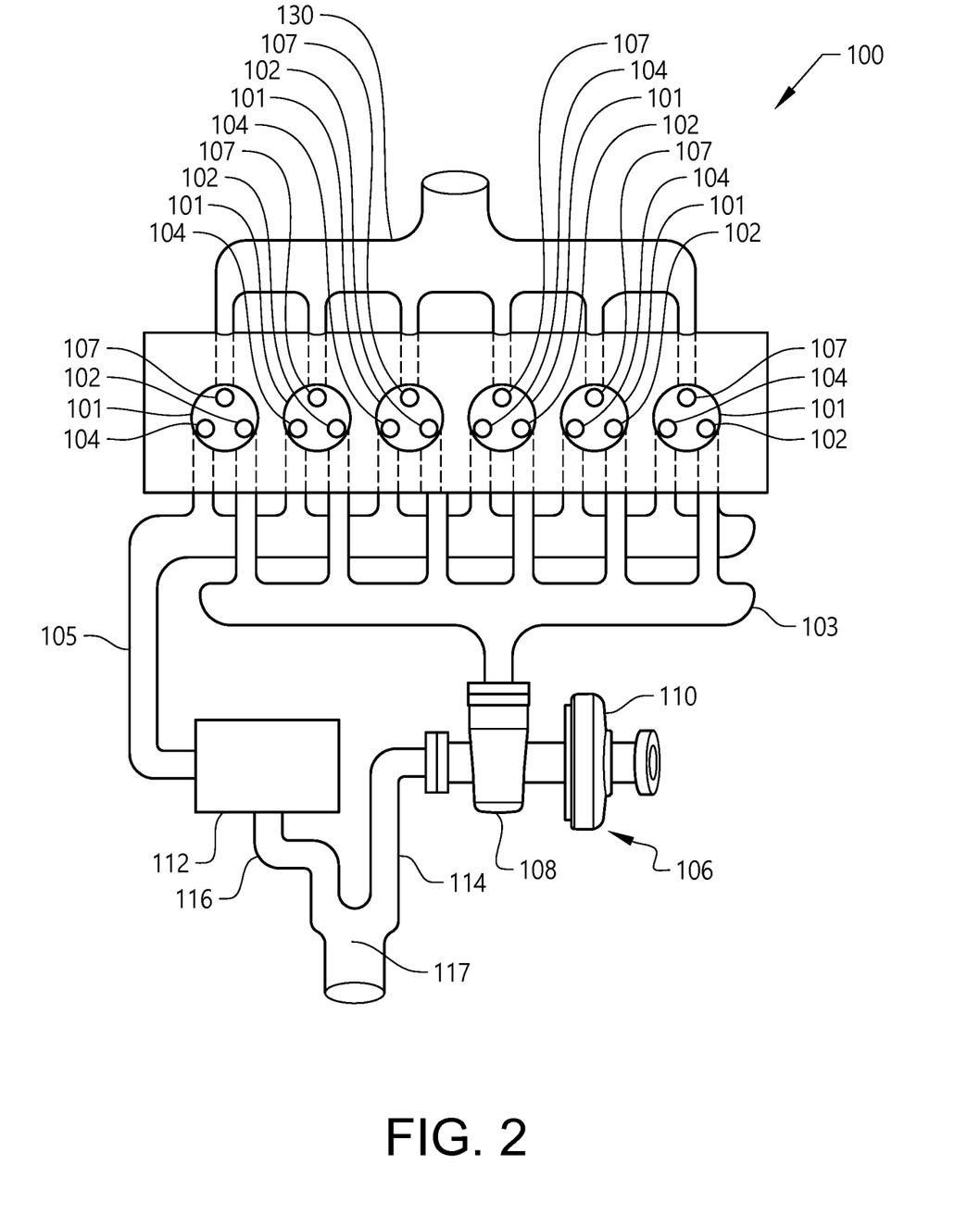
FIG. 2 is a schematic illustration of an internal combustion engine arrangement according to an example embodiment.

Reference is made to FIG. 2, which is a schematic illustration of an internal combustion engine arrangement 100 according to an example embodiment. As can be seen, the internal combustion engine arrangement 100 comprises an inlet manifold 130 arranged to transport air to each of the cylinders 101 of the internal combustion engine arrangement 100 via a respective inlet valve 107. Thus, during the intake stroke of a cylinder 101, air is directed through the inlet manifold 130 and into the cylinder 101 via the open inlet valve 107.

Each of the cylinders 101 further comprises a first 102 and a second 104 outlet valve for directing exhaust gas, generated during the combustion stage out from the combustion cylinder 101. The internal combustion engine arrangement 100 further comprises a first 103 and a second 105 exhaust gas manifold arranged in fluid communication with each of the cylinders 101 of the internal combustion engine arrangement 100. In detail, the first exhaust gas manifold 103 is arranged in fluid communication with the first outlet valve 102 such that exhaust gas directed out from the combustion cylinder 101 via the first outlet valve 102 is provided into the first exhaust gas manifold 103. Likewise, the second exhaust gas manifold 105 is arranged in fluid communication with the second outlet valve 104 such that exhaust gas directed out from the combustion cylinder 101 via the second outlet valve 104 is provided into the second exhaust gas manifold 105.

The internal combustion engine arrangement 100 further comprises an exhaust emission control device 112, in the following referred to as a three-way catalyst 112, and a turbocharger arrangement 106, which turbocharger arrangement 106 comprises a turbine 108 and a compressor 110. In further detail, the turbine 108 is arranged in downstream fluid communication with the first exhaust gas manifold 103, i.e. exhaust gas in the first exhaust gas manifold is further directed into the turbine. The three-way catalyst 112 on the other hand is arranged in downstream fluid communication with the second exhaust gas manifold 105, i.e. exhaust gas in the second exhaust gas manifold is further directed into the three-way catalyst.

As is further depicted in FIG. 2, the internal combustion engine arrangement 100 comprises a first exhaust conduit 114 connected in downstream fluid communication with the turbine 108, and a second exhaust conduit 116 connected in downstream fluid communication with the three-way catalyst 112. Thus, exhaust gas directed through the turbine is subsequently directed through the first exhaust conduit 114, while exhaust gas directed through the three-way catalyst 112 is subsequently directed through the second exhaust conduit 116. The first 114 and second 116 exhaust conduits are connected to each other at a position 117 downstream the turbine 108 and the three-way catalyst 112, respectively. Thus, the turbine 108 and the three-way catalyst 112 are arranged in parallel with each other, which means that exhaust gas directed through the turbine will not enter the three-way catalyst, as well as exhaust gas directed through the three-way catalyst will not enter the turbine.

The second exhaust gas manifold 105 may preferably be arranged as a heat insulated exhaust gas manifold comprising a heat insulating layer (not shown) for reducing heat losses.

Figure 3:
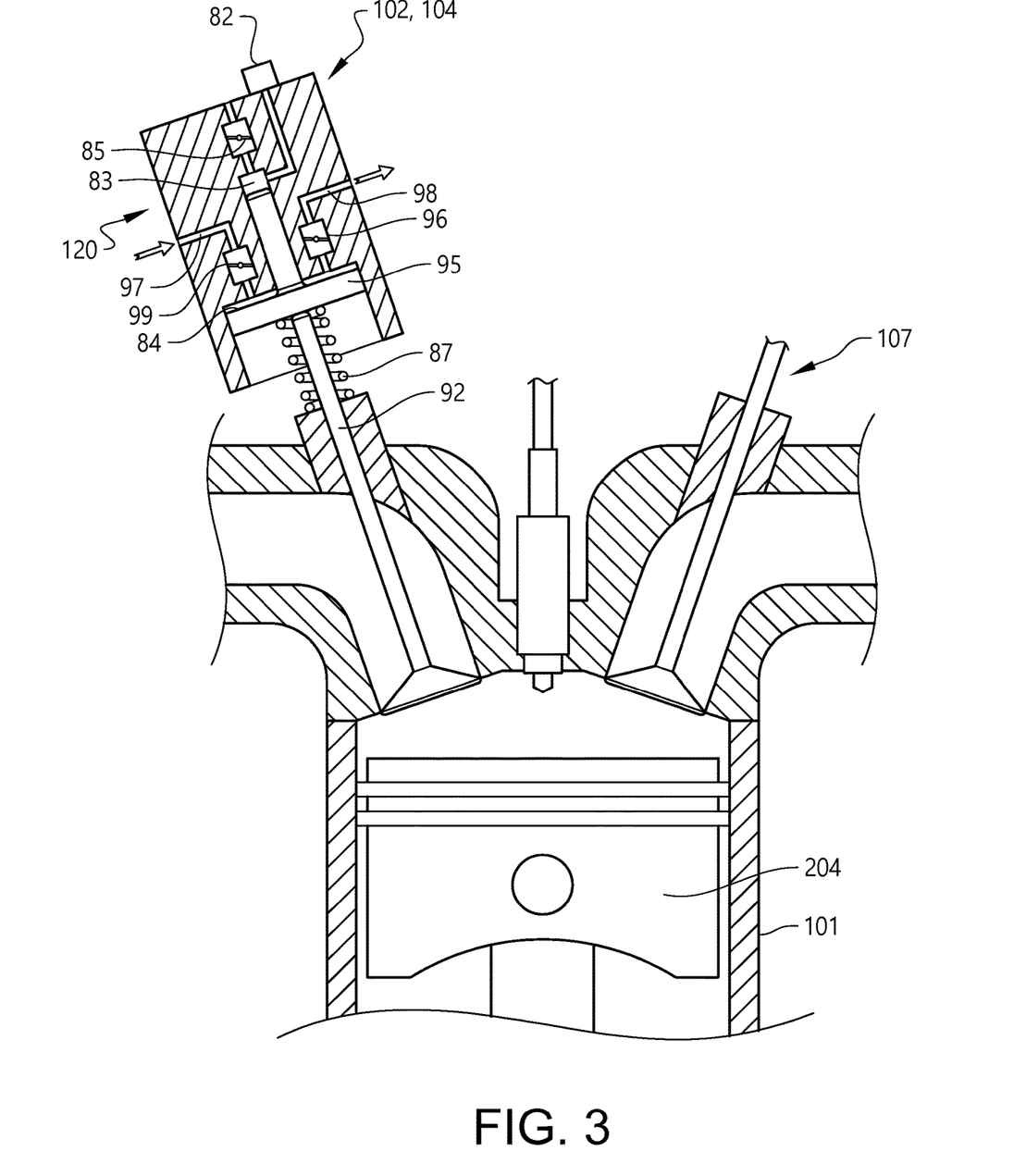
FIG. 3 is an example of a valve for use as an inlet valve or as both of the first and second outlet valves according to an example embodiment.

Reference is mow made to FIG. 3, which is an example of a valve for use as the inlet valve 107 as well as for the first 102 and second 104 outlet valves according to an example embodiment. Although FIG. 3 only illustrates and describes details with regards to the outlet valves 102, 104, it should be readily understood that a similar arrangement can be used for the inlet valve 107 as well. Also, FIG. 3 illustrates only one outlet valve 102, 104 for simplicity of illustration. Naturally, the cylinder 102 comprises the two valves as clearly depicted in FIG. 2.

FIG. 3 illustrate the combustion cylinder 101, the reciprocating piston 204, the inlet 107 and outlet 102, 104 valve, wherein the outlet valve 102, 104 comprises a flow controllable actuator 120, which flow controllable actuator is arranged to controllably operate the outlet valve between the open position and the closed position. The flow controllable actuator 120 is thus preferably connected to the control unit 400 depicted in FIG. 1 for controlling operation thereof. The description in relation to FIG. 3 will now solely focus on the flow controllable actuator 120 for presenting an example embodiment of how to control the operation of the outlet valve 102, 104.

The outlet valve 102, 104 thus comprises the flow controllable actuator 120 operatively connected to a valve member 92. The valve member is here a lift type valve member. By way of example, the lift type valve member can be a conventional poppet valve or the like. However, the valve member may likewise be provided as a rotational type valve member, a slide valve member, a seat valve member or the like. The actuator of the valve is configured to operate the valve member 92 by pneumatic pressure. As such, the valve member is a pressure activated valve member. In this example, the flow controllable actuator 120 comprises a pneumatic actuator operatively connected to a corresponding valve member. In particular, the actuator 120 of the outlet valve 102, 104 is configured to operate the valve member via an actuator piston 95. The actuator 120 is in fluid communication with a pressurized air medium (not shown) via an air inlet 97 and an air outlet 98. In this manner, the pneumatic valve actuation utilizes compressed air to control the valve opening of the valve member, i.e. to operate the valve member between an open state and a closed state. Accordingly, the actuator comprises at least the air inlet 97 for the pressure fluid medium and at least the air outlet 98 for the pressure fluid medium. The pressurized air flowing in via the air inlet 97 is directed towards the actuator piston 95 by means of an air inlet valve 99. The air inlet valve 99 is disposed in the air inlet and configured to open and close the air inlet so as to control the flow of air to the actuator piston 95. Further, there is disposed an air outlet valve 96 in the air outlet 98, which is configured to open and close the air outlet in order to permit air to discharge from the actuator. Typically, as shown in FIG. 3, the actuator piston 95 is disposed in a chamber 84 defining a space for a reciprocating movement of the actuator piston 95. The actuator piston 95 is operable between a first position (an upper position), in which the valve member 92 is in the closed state, and a second position (a lower position), in which the valve member 92 is in the open state. The actuator piston 95 is operable between the first position (upper position) and the second position (lower position) by pressurizing and depressurizing the actuator. In addition, the flow controllable valve comprises a spring 87 arranged in-between the valve member 92 and the actuator piston 95 so as to return the valve member to its original position, i.e. corresponding to the upper position of the actuator piston disc 95.

The flow controllable valve may also have a hydraulic circuit comprising a hydraulic valve 85 and a chamber 82. Hydraulic fluid is provided to a chamber 83 in connection with the actuator piston 95. Hereby, when the piston moves to the second position, the hydraulic fluid in the chamber 83 dampen the motion of the actuator piston 95. The hydraulic fluid may also keep the valve stationary at a given position.

Figure 4:
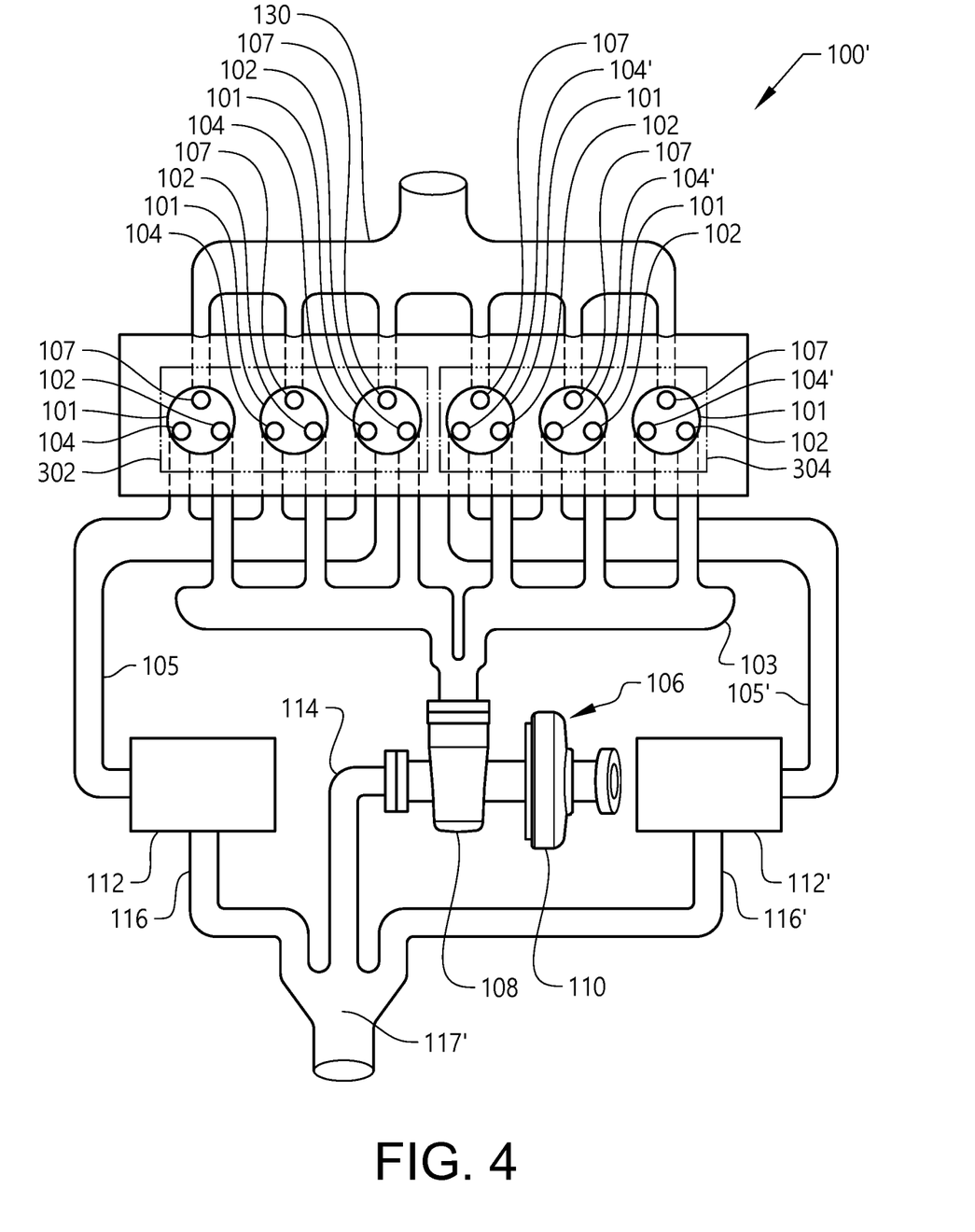
FIG. 4 is a schematic illustration of an internal combustion engine arrangement according to another example embodiment.

Turning now to FIG. 4, which is a schematic illustration of an internal combustion engine arrangement 100' according to another example embodiment. The embodiment depicted in FIG. 4 is in many ways similar to the embodiment depicted in FIG. 2. However, and as can be seen, the internal combustion engine arrangement 100' in FIG. 4 has divided the combustion cylinders 101 into a first set of internal combustion cylinders 302 and a second set of internal combustion cylinders 304. The cylinders 101 of the first set of combustion cylinders 302 is connected to the first 103 and second 105 exhaust gas manifolds as described above in relation to the description of FIG. 2. The cylinders 101 of the second set of combustion cylinders 304 are on the other hand connected to the first exhaust gas manifold 103 as well as to third exhaust gas manifold 105'. The internal combustion engine arrangement 100' in FIG. 4 thus comprises a third exhaust gas manifold 105' as well as an additional exhaust emission control device 112', i.e. an additional three-way catalyst 112'. In detail, the first outlet valves 102 of the cylinders 101 of the second set of combustion cylinders 304 are arranged in fluid communication with the turbine via the first exhaust gas manifold, while the second outlet valves 104' of the cylinders 101 of the second set of combustion cylinders 304 are arranged in fluid communication with the additional three-way catalyst 112' via the third exhaust gas manifold 105'. The cylinders 101 of the first 302 and second 304 sets of combustion cylinders can be operated independently of each other.

Moreover, the internal combustion engine arrangement 100' in FIG. 4 comprises a third exhaust conduit 116' connected in downstream fluid communication with the additional three-way catalyst 112'. Thus, exhaust gas directed through the additional three-way catalyst 112' is subsequently directed through the third exhaust conduit 116'. The first 114, second 116 and third 116' exhaust conduits are connected to each other at a position 117' downstream the turbine 108, the three-way catalyst 112, and the additional three-way catalyst, respectively. Thus, the turbine 108, the three-way catalyst 112 and the additional three-way catalyst 112' are all arranged in parallel with each other.

Figure 5A:
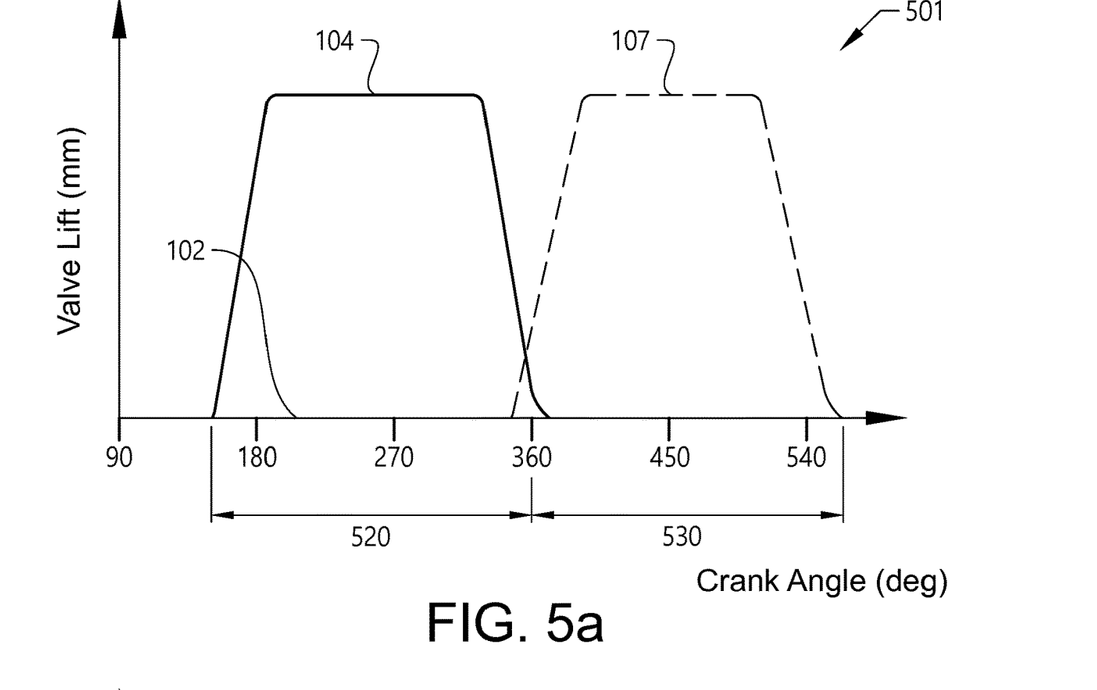
FIGS. 5a and 5b are graphs illustrating example embodiments of controlling the outlet valves according to example embodiments.
Figure 5B:
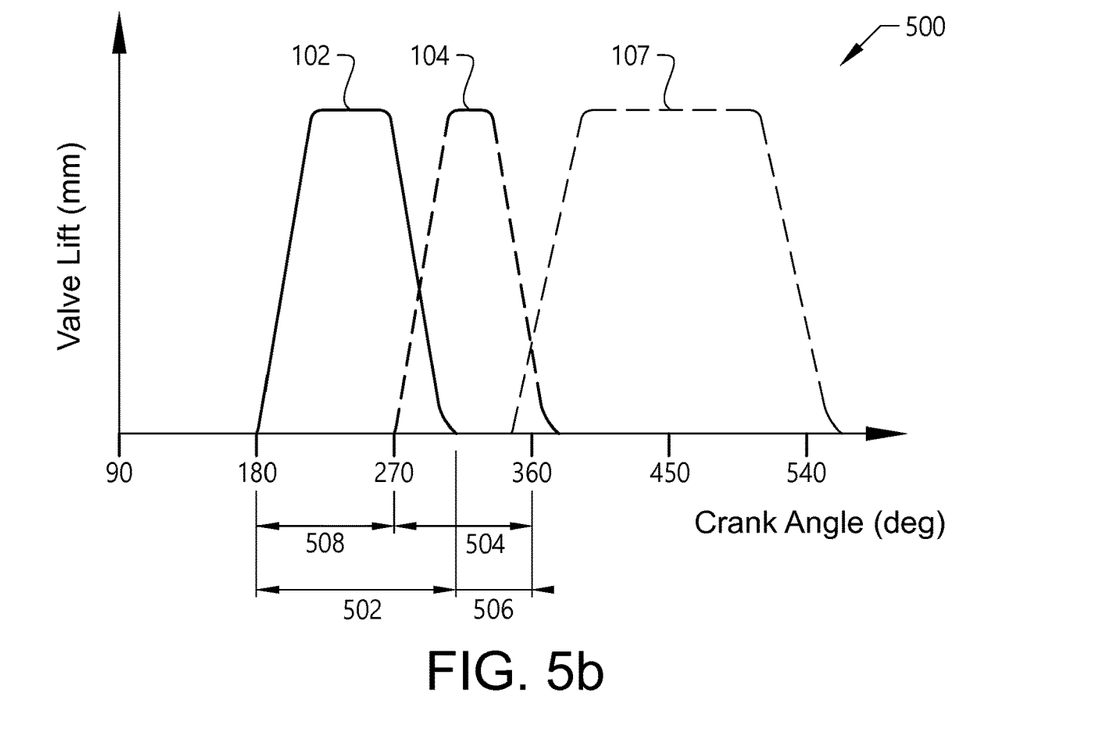

Reference is now made to FIGS. 5*a*-5*b* which are graphs illustrating example embodiments of controlling the outlet valves according to example embodiments particularly suitable when using an internal combustion engine according to the above described example embodiments. For simplicity of understanding, reference will however only be made to the embodiment depicted in FIG. 2. The graphs particularly illustrate the behavior for the type of valve illustrated in FIG. 3. It should be readily understood that the illustrations in FIGS. 5*a*-5*b* are merely schematic. The gradient of the lift curves in relation to the crank angle degree may for example vary depending on the rotation speed of the internal combustion engine.

Starting with FIG. 5*a*, which is a graph illustrating an example embodiment for operating the internal combustion engine 100, during cold start thereof. The horizontal axis illustrates the exhaust phase 520 and the intake phase 530 of a four stroke cycle. The vertical axis schematically illustrates the openness degree of the valves. In particular, and as can be seen in FIG. 5a, during cold start the first outlet valve 102 is arranged in the closed position during the entire exhaust stroke, while the second outlet valve 104 is arranged in the open position. Accordingly, exhaust gas generated during the combustion stage is solely directed into the second exhaust gas manifold 105 and further directed into the three-way catalyst 112. Hence, no exhaust gas is directed into the turbine 108 as the first outlet valve is maintained closed. During the subsequent intake stroke 530, both the first 102 and the second 104 outlet valves are closed and the inlet valve 107 is arranged in the open position.

Turning now to FIG. 5b, which is a graph illustrating another example embodiment for operating the internal combustion engine 100. As can be seen, the first outlet valve 102 is arranged in the open position during the initial phase of the exhaust stroke. In more detail, the first outlet valve 102 is open during a first portion 502 of the exhaust stroke, where after the first outlet valve 102 is closed a first predetermined distance 506 before the piston reaches the BDC. Hereby, exhaust gas is directed to the first exhaust gas manifold 103 and the turbine 108 during the first portion 502 of the exhaust stroke. As further depicted in FIG. 5b, a predetermined distance 508 after the piston has left the BDC, the second outlet valve 104 is arranged in the open position during a second portion 504 of the exhaust stroke. Preferably, the second portion 504 ends at the end of the exhaust stroke when the piston reaches the TDC. According to the example embodiment depicted in FIG. 5b, the first 102 and second 104 outlet valves arranged in the open position by an overlap. FIG. 5b is merely a schematic illustration and the overlap may be smaller or larger than what is depicted. In fact, there may be no overlap at all. During the second, subsequent portion of the exhaust stroke, exhaust gas is thus directed to the second exhaust gas manifold 105 and into the three-way catalyst 112. Hereby, the combustion cylinder is scavenging towards atmospheric pressure in the second exhaust gas manifold 105. Scavenging towards atmospheric pressure is beneficial as the exhaust gas of the scavenging phase has a low mass flow which may not contribute much to the operation of the turbine.

Figure 6:
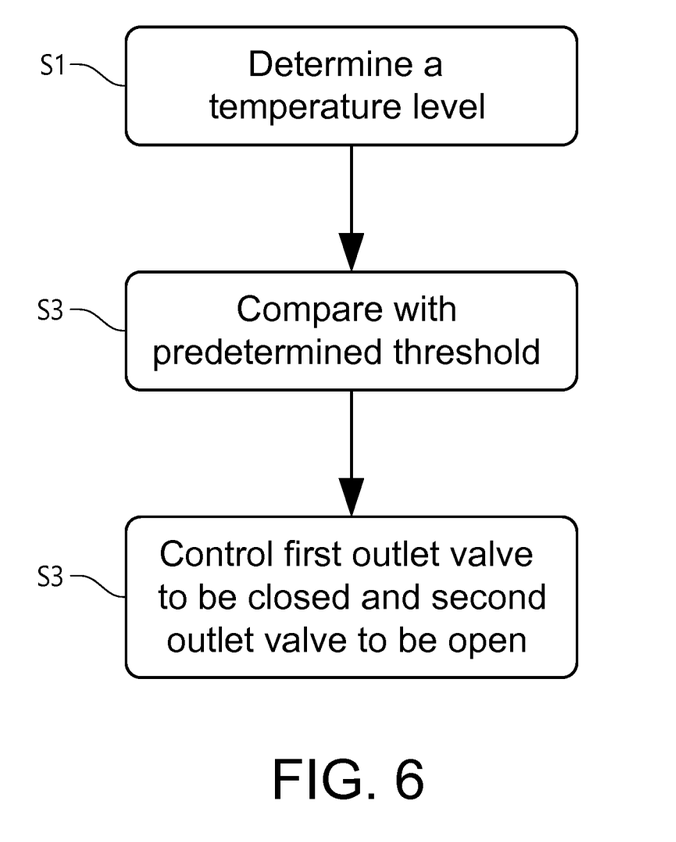
FIG. 6 is flow chart of a method for controlling an internal combustion engine according to an example embodiment.

Finally, in order to sum up, reference is made to FIG. 6 which is a flow chart of a method for controlling the above described internal combustion engine according to an example embodiment.

In a first step, the temperature level of the internal combustion engine arrangement 100 is determined S1. The temperature level is compared S2 with a predetermined threshold limit. Hereby, it can be determined if the internal combustion engine is operated in a cold start mode, or if it has not yet been heated sufficiently during operation. If the temperature level is below the predetermined threshold limit, the first outlet valve 102 is controlled S3 to be arranged in a closed position and the second outlet valve is controlled to be arranged in an open position during an exhaust stroke of the internal combustion engine 100, 100', such that exhaust gas generated during combustion is directed solely to the exhaust emission control device.

It is to be understood that the present invention is not limited to the embodiments described above and illustrated in the drawings; rather, the skilled person will recognize that many changes and modifications may be made within the scope of the appended claims. It should also be readily understood that the above described steps can be executed simultaneously and the above described order is merely for simplicity of understanding.

The invention claimed is:

1. A turbocharged internal combustion engine system comprising:
    an internal combustion engine;
    a combustion cylinder provided with a reciprocating piston movable between a top dead center and a bottom dead center within the combustion cylinder;
    a first outlet valve connected to the combustion cylinder for controllably directing exhaust gas from the combustion cylinder to a first exhaust gas manifold of the internal combustion engine;
    a second outlet valve connected to the combustion cylinder for controllably directing exhaust gas from the combustion cylinder to a second exhaust gas manifold of the internal combustion engine, the second exhaust gas manifold comprising a heat insulating layer, wherein the first and second outlet valves each comprises a respective first and second flow controllable actuator, the flow controllable actuators being arranged to controllably operate the respective outlet valve between an open position and a closed position;
    a turbocharger comprising a turbine and a compressor, wherein the turbine is arranged in fluid communication with the first exhaust gas manifold, wherein a first exhaust conduit is connected in downstream fluid communication with the turbine;
    a three-way catalytic converter arranged in fluid communication with the second exhaust gas manifold, wherein a second exhaust conduit is connected in downstream fluid communication with the three-way catalytic converter, wherein the first and second exhaust conduits are connected to each other at a position downstream the turbine and the three-way catalytic converter, respectively, such that the three-way catalytic converter and the turbine are arranged in parallel with each other;
    at least one sensor; and
    a control unit connected to the first and second flow controllable actuators for operation thereof, wherein the control unit is configured to position the first outlet valve in the open position during a first portion of the exhaust stroke, and to position the second outlet valve in the open position during a second portion of the exhaust stroke, wherein the second portion ends after the first portion, the control unit including executable instructions stored on a non-transitory memory to:
        receive a signal indicative of a temperature level of the internal combustion engine from the at least one sensor;
        compare the temperature level with a predetermined threshold limit; and when the temperature level is below the predetermined threshold limit;
        control the first outlet valve to be arranged in a closed position and the second outlet valve to be arranged in an open position during an exhaust stroke of the internal combustion engine such that exhaust gas generated during combustion is directed solely to the three-way catalytic converter during an entire exhaust stroke, and operate the internal combustion engine in a stoichiometric mode.

2. The turbocharged internal combustion engine system according to claim 1, wherein the control unit further includes executable instructions to position the first outlet valve in the closed position at a first predetermined distance before the piston reaches the top dead center during the exhaust stroke.

3. The turbocharged internal combustion engine system according to claim 1, wherein the second portion of the exhaust stroke is initiated at a second predetermined distance after the piston has left the bottom dead center during the exhaust stroke.

4. The turbocharged internal combustion engine system according to claim 1, wherein the internal combustion engine comprises a plurality of combustion cylinders, the plurality of combustion cylinders constitutes a first and a second set of combustion cylinders, wherein the first set of combustion cylinders is arranged in fluid communication with the turbine and the three-way catalytic converter, and the second set of combustion cylinders is arranged in fluid communication with the turbine and an additional three-way catalytic converter.

5. The turbocharged internal combustion engine system according to claim 4, wherein the three-way catalytic converter and the additional three-way catalytic converter are arranged in parallel with each other.

6. The turbocharged internal combustion engine system according to claim 1, where the internal combustion engine is a diesel fuel internal combustion engine operated in a four-stroke fashion.

7. A method for operating a turbocharged internal combustion engine system comprising:
an internal combustion engine;
a combustion cylinder provided with a reciprocating piston movable between a top dead center and a bottom dead center within the combustion cylinder;
a first outlet valve connected to the combustion cylinder for controllably directing exhaust gas from the combustion cylinder to a turbine of a turbocharger via a first exhaust gas manifold;
a second outlet valve connected to the combustion cylinder for controllably directing exhaust gas from the combustion cylinder to a three-way catalytic converter via a second exhaust gas manifold comprising a heat insulating layer, wherein the first and second outlet valves each comprises a respective first and second flow controllable actuator, the flow controllable actuators being arranged to controllably operate the respective outlet valve between an open position and a closed position;
a first exhaust conduit is connected in downstream fluid communication with the turbine and a second exhaust conduit is connected in downstream fluid communication with the three-way catalytic converter, wherein the first and second exhaust conduits are connected to each other at a position downstream the turbine and the three-way catalytic converter, respectively;
at least one sensor; and
a control unit including a non-transitory computer-readable storage medium having instructions stored which, when executed by the processor, cause the processor to perform the method comprising the steps of:
positioning the first outlet valve in the open position during a first portion of the exhaust stroke;
positioning the second outlet valve in the open position during a second portion of the exhaust stroke, wherein the second portion ends after the first portion; the method further comprising the steps of:
determining a temperature level of the internal combustion engine from the at least one sensor;
comparing the temperature level with a predetermined threshold limit;
receiving a signal from an oxygen sensor indicative of oxygen levels in the exhaust gases;
controlling the first outlet valve to be arranged in a closed position and the second outlet valve to be arranged in an open position during an exhaust stroke of the internal combustion engine such that exhaust gas generated during combustion is directed solely to the three-way catalytic converter when the temperature level is below the predetermined threshold limit; and
controlling an inlet valve of the internal combustion engine such that the oxygen level in the combustion gases is substantially zero.

8. The method according to claim 7, wherein the turbocharged internal combustion engine system comprises a plurality of combustion cylinders, the plurality of combustion cylinders constitutes a first and a second set of combustion cylinders, wherein the step of controlling the inlet valve such that the oxygen level in the combustion gases is substantially zero is performed solely for inlet valves of one of the first and second sets of combustion cylinders.

9. A computer program comprising program code including computer readable instructions that are stored on a non-transitory readable medium, which program code when executed by a computer, causes the computer to perform the steps of the method as recited in claim 7.

10. A computer program comprising computer readable instructions stored on a non-transitory readable medium, which computer program when running on a computer, causes the computer to execute the steps of the method as recited in claim 7.

11. A vehicle comprising: an internal combustion engine including:
a combustion cylinder provided with a reciprocating piston movable between a top dead center and a bottom dead center within the combustion cylinder;
a first outlet valve connected to the combustion cylinder for controllably directing exhaust gas from the combustion cylinder to a first exhaust gas manifold of the internal combustion engine;
a second outlet valve connected to the combustion cylinder for controllably directing exhaust gas from the combustion cylinder to a second exhaust gas manifold of the Internal combustion engine, the second exhaust gas manifold comprising a heat insulating layer,
wherein the first and second outlet valves each comprises a respective first and second flow controllable actuator, the flow controllable actuators being arranged to controllably operate the respective outlet valve between an open position and a closed position:
a turbocharger comprising a turbine and a compressor, wherein the turbine is arranged in fluid communication with the first exhaust gas manifold, wherein a first exhaust conduit is connected in downstream fluid communication with the turbine;
a three-way catalytic converter arranged in fluid communication with the second exhaust gas manifold, wherein a second exhaust conduit is connected in downstream fluid communication with the three-way catalytic converter, wherein the first and second exhaust conduits are connected to each other at a position downstream the turbine and the three-way catalytic converter, respectively, such that the three-way catalytic converter and the turbine are arranged in parallel with each other, and a control unit connected to the first and second flow controllable
actuators for operation thereof,
wherein the control unit is configured to position the
first outlet valve in the open position during a first
portion of the exhaust stroke, and to position the
second outlet valve in the open position during a
second portion of the exhaust stroke,
wherein the second portion ends after the first portion, the
control unit including executable instructions stored on
non-transitory memory to:
receive a signal indicative of a temperature level of the
internal combustion engine from the at least one sensor;
compare the temperature level with a predetermined
threshold limit: and
when the temperature level is below the predetermined
threshold limit;
control the first outlet valve to be arranged in a closed
position and the second outlet valve to be arranged in
an open position during an exhaust stroke of the
Internal combustion engine such that exhaust gas
generated during combustion is directed solely to the
three-way catalytic converter during an entire
exhaust stroke, and
operate the internal combustion engine in a stoichio-
metric mode.

\* \* \* \* \*